UNITED STATES PATENT OFFICE.

JUSTUS W. MATTHAEI, OF INGRAM, PENNSYLVANIA, ASSIGNOR TO ARMSTRONG CORK COMPANY, OF PITTSBURGH, PENNSYLVANIA, A CORPORATION OF PENNSYLVANIA.

COMPOSITION OF MATTER FOR USE AS A LEATHER SUBSTITUTE.

1,326,681.     Specification of Letters Patent.     Patented Dec. 30, 1919.

No Drawing.     Application filed December 3, 1918. Serial No. 265,147.

*To all whom it may concern:*

Be it known that I, JUSTUS W. MATTHAEI, a citizen of the United States, residing at Ingram, Allegheny county, Pennsylvania, have invented a new and useful Composition of Matter for Use as a Leather Substitute, of which the following is a full, clear, and exact description.

My invention has relation to a novel composition of matter designed more particularly for use as a substitute for leather for certain purposes.

The object of my invention is to provide a material which can be readily manufactured on a commercial scale and which forms a highly efficient substitute for leather for certain purposes, and particularly for use for soles for boots and shoes, packings, etc. A further object of my invention is to provide a novel method of manufacturing such materials.

In producing my composition of matter, I form a mixture of crude rubber, rubber shoddy (reclaimed rubber), cork particles, a fibrous material, a binder, one or more mineral fillers and sulfur. These are thoroughly mixed together with or without the use of a coloring matter. I also preferably add a dehydrating agent, and may also use a small percentage of lubricating material. After thoroughly mixing, the material is rolled out in sheet form; the desired articles are cut or died therefrom and are then placed in a mold and vulcanized under heat and pressure.

I have obtained excellent results from the following mixture:

| | |
|---|---|
| Crude rubber | 100 lbs. |
| Bone glue | 15 " |
| Black rags | 40 " |
| Ground cork | 90 " |
| Magnesium oxid | 15 " |
| No. 86 shoddy (reclaimed rubber) | 125 " |
| Hydrated lime | 10 " |
| Sulfur | 13 " |
| Mineral rubber | 10 " |
| Petrolatum | 1 " |

A suitable coloring matter is also employed. If a black product is desired, 10 pounds of lampblack may be added. If a reddish or tan product is desired, the same amount of red oxid of iron may be added.

In making the composition, the crude rubber in mass form is fed to heated mixing rolls by which it is thoroughly worked. The shoddy is then added and worked in with the rubber. The mineral rubber, glue, rags, all the mineral fillers, the cork and the petrolatum are next worked in, in the order stated.

After the ingredients have been thoroughly mixed, it is rolled out into sheets of the desired thickness; the articles to be formed are cut or died therefrom, and are then vulcanized in the usual manner in molds under heat and pressure.

The material produced by my novel composition and method possesses a relatively dense homogeneous body; has a high degree of flexibility; possesses good wearing qualities, and is peculiarly adapted for use in boot and shoe soles, because of its adhesive or tractive qualities whereby the soles are rendered highly non-slipping. It is also waterproof.

It will be noted that in point of bulk, the cork particles or flour constitute the predominating material. The amount of cork employed in the mixture, such as above given, may vary from 50 to 110 pounds, and the crude rubber used may also vary from 75 to 125 pounds. The effect of increasing the cork and decreasing the rubber is to render the product more brittle; while if the cork is decreased and the rubber increased, the resulting material has more similarity to rubber and less similarity to leather. The magnesium oxid has an excellent effect in assisting the vulcanization and also in increasing the flexibility of the product. Other equivalent materials may, however, be employed. The hydrated lime in connection with the magnesium oxid serves to take up moisture during the vulcanization. The mineral rubber increases the water-proof qualities of the product and also the density of "body" of the product.

While the specific example above given is preferred, I do not limit myself to the use of all the ingredients therein stated, nor do I limit myself to the particular proportions which I have described, as these may vary to some extent without materially affecting the product.

I claim:

1. A vulcanized leather substitute, formed from a composition of matter composed of an excess by weight of rubber, and an excess by bulk of cork particles, in combination with a fibrous material, reclaimed rubber, sulfur and glue, substantially as described.

2. A vulcanized leather substitute, formed from a composition of matter having as its main ingredients crude rubber, reclaimed rubber, cotton fibers, cork particles, sulfur, and a binder, the cork exceeding the other ingredients in bulk, substantially as described.

3. A vulcanized leather substitute, formed from a composition of matter having as its main ingredients crude rubber, reclaimed rubber, cotton fibers, cork particles and sulfur, together with glue and a lubricant, the cork exceeding the other ingredients in bulk, substantially as described.

4. A vulcanized leather substitute, formed from a composition of matter having as its main ingredients crude rubber, reclaimed rubber, cotton fibers, cork particles and sulfur, together with a binder and a dehydrating material, the rubber by weight being in excess of the other materials employed, substantially as described.

5. A vulcanized leather substitute formed from a composition of matter, containing the following ingredients in substantially the proportions named, viz:

| | |
|---|---|
| Crude rubber | 72 to 125 pounds |
| Glue | 15 pounds |
| Black rags | 40 pounds |
| Ground cork | 50 to 110 pounds |
| Magnesium oxid | 15 pounds |
| Reclaimed rubber | 125 pounds |
| Hydrated lime | 10 pounds |
| Sulfur | 13 pounds |
| Mineral rubber | 10 pounds |
| A lubricant | 1 pound |

6. A vulcanized leather substitute, formed from a composition of matter composed mainly of rubber, cork particles, a fibrous material, sulfur and glue, the rubber exceeding by weight the total weight of the other ingredients of the composition, substantially as described.

7. A vulcanized leather substitute, formed from a composition of matter composed mainly of rubber, cork particles, a fibrous material, sulfur, lime and glue, the rubber exceeding by weight the total weight of the other ingredients of the composition, substantially as described.

8. A composition of matter, comprising an excess by weight of rubber and an excess by bulk of cork particles in combination with a fibrous material, a binder, a filler and sulfur; substantially as described.

9. A composition of matter, comprising an excess by weight of rubber and an excess by bulk of cork particles in combination with a fibrous material, a binder, a mineral filler, sulfur and a dehydrating agent; substantially as described.

In testimony whereof I have hereunto set my hand.

JUSTUS W. MATTHAEI.